Oct. 6, 1936.  J. Y. BLAZEK ET AL  2,056,706
SURFACE FINISHING MACHINE
Filed Oct. 26, 1933
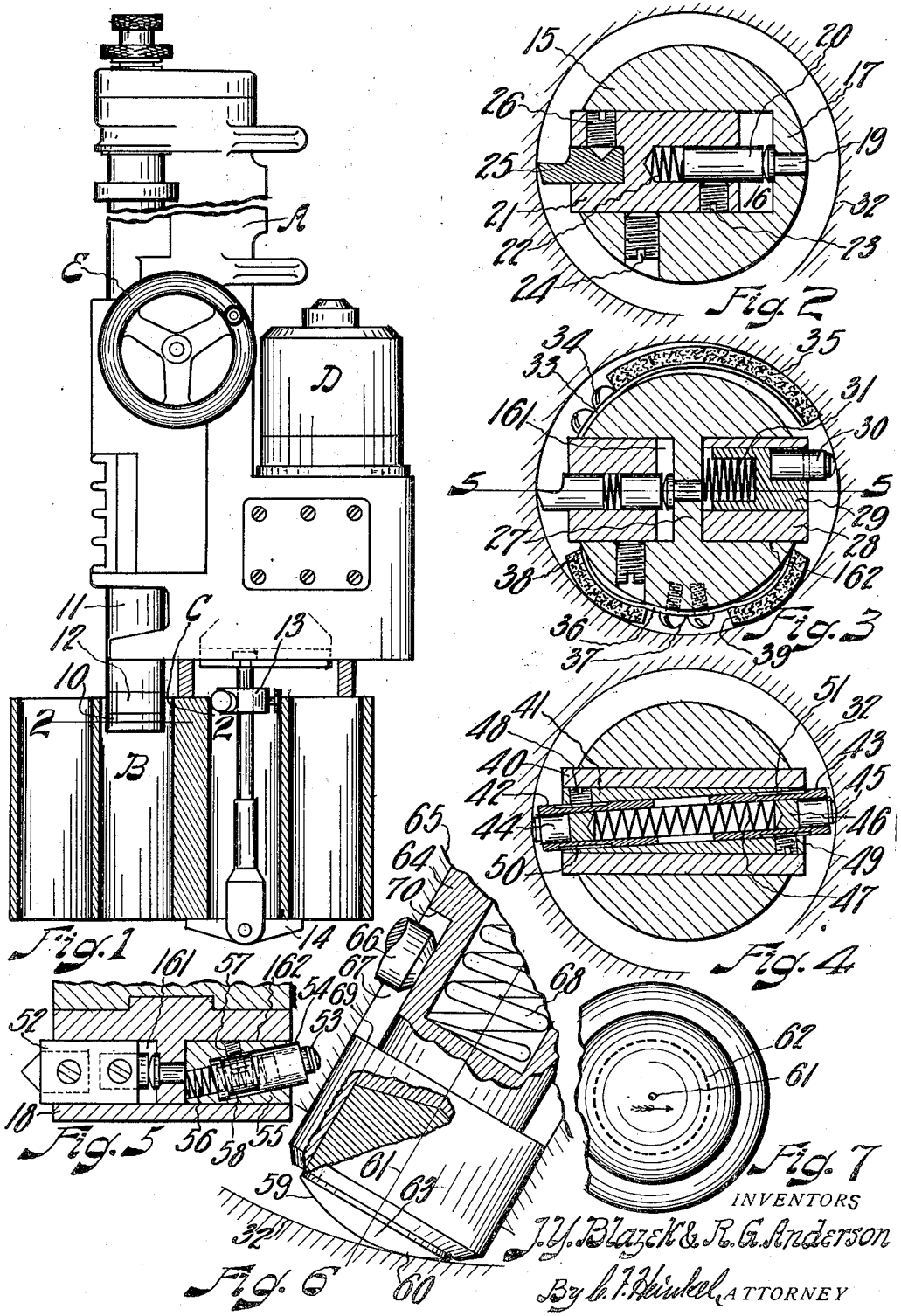
INVENTORS
J. Y. Blazek & R. G. Anderson
By L. T. Heinkel, ATTORNEY Patented Oct. 6, 1936

2,056,706

UNITED STATES PATENT OFFICE 2,056,706

SURFACE FINISHING MACHINE

John Y. Blazek, Maple Heights, and Russell G. Anderson, Cleveland, Ohio, assignors to Lempco Products, Inc., Bedford, Ohio Application October 26, 1933, Serial No. 695,292

4 Claims. (Cl. 77—2)

The present invention relates to burnishing holes and incidentally to boring holes and burnishing the same.

Objects of the present invention are to provide a burnishing tool which is of lasting quality, which is self dressing during operation thereof, and which tends to squeeze higher parts of a surface into adjacent lower parts thereof.

Another object of the present invention is to provide, in a boring device, exchangeability of a boring tool with a burnishing tool so that a hole can be bored and burnished by the same device and without resetting the same.

Another object of the present invention is to provide, in a boring device, means for boring holes and burnishing the wall of the hole during the boring of the hole.

Another object of the present invention is to provide a cleaning means for the surface to be burnished preceding the burnishing tool.

Another object of the present invention is to provide a burnishing tool which is self dressing by and during operation thereof.

Other objects will be pointed out during the description of the mechanism shown in the drawing or will become obvious or apparent or will suggest themselves upon an inspection of this specification and the drawing.

In cylinders and the like it is customary to bore a cylinder as smooth as possible, and to work a piston in the cylinder until the high spots are worn down for a leak proof fit of the piston in the cylinder.

This operation requires time and power and extreme care not to work the piston too strenuously to avoid what is commonly known as cutting between the piston and the cylinder which usually leaves grooves in the cylinder wall or in the outside of the piston to promote leakage rather than prevent it.

Grinding of cylinders has been resorted to for this same purpose but is not followed because grinding wheels work by abrasion and do not cut material as in a cutting tool and deposit particles of the cylinder material and particles of the grinding wheel material in depressions of the wall of the bore which particles later become loose and wedge themselves on the higher parts of the wall and start "cutting" and by that cutting release other particles each of which will act as the first one with no end of trouble in sight under such conditions.

The present invention intends or contemplates to press the higher parts of a wall into adjacent lower parts thereof so that there will not be any loose parts to start "cutting" later.

This specification uses the term "burnish" for want of a better descriptive term. In usual burnishing, a solid bar is driven through a bore and thereby bends high parts of a bore into lower parts thereof and by this bending quite frequently breaks off the high parts or loosens the same sufficiently so that it will eventually get into the joint and produce cutting therein.

Experiments have been made to use for burnishing individual rotatable rollers which rotate on an axis parallel with the burnishing face thereof. These burnishing rollers are better than the solid burnishing bars in that the breaking of the high parts of the bore has been reduced but not completely eliminated so that the trouble of "cutting" still exists by that burnishing roller means.

In the present invention, the burnishing tool is mounted in the same manner as a cutting tool but there is no rotation thereof as in the roller burnishing tool. The present burnishing tool rotates on an axis substantially at right angles to the axis of the boring spindle of the device so that the end of the tool rotates against the surface, and thereby squeezes the high parts of a surface into adjacently lower parts thereof and in that respect acts differently from either the bar or the roller burnishing tools, produces a very highly burnished surface and does not leave any material in the surface which material may become loose and get in between the burnished surface and one moving in close contact thereon.

Experiments have demonstrated that the axis of the burnishing tool may be parallel with the axis of the boring tool when boring and burnishing is done in one operation. Also that, in such case, the axis of the burnishing tool may be angular or inclined from the axis of the boring tool. Whichever method is used is best determined by the work to be done and the conditions under which the tool is to work.

The general principle to be attained is to cause rotation of the burnishing tool during its operation and that the contact point of the burnishing tool on the surface to be burnished is eccentric with the axis of the burnishing tool which feature causes the burnishing tool to rotate while it is burnishing. The feeding of the burnishing tool over the surface aids to cause this rotation by moving the tool onto new high parts of the surface to take hold of the tool for rotation thereof so that the same can not find a dead center and must rotate. This feature is augmented by arranging the contact point of the tool so that it will always be on the leading side of the axis of rotation of the tool so that rotation of the tool head on the longitudinal axis of the spindle of the device always presents new high parts to cause rotation of the burnishing tool.

The present invention is illustratively shown in the accompanying drawing in which:

Fig. 1 is a side view of a cylinder boring device removably on the top of a cylinder and having a cylinder boring means thereon exchangeable with a cylinder burnishing means embodying the present invention.

Fig. 2 is a horizontal section of the boring tool means taken on the line 2—2 of Fig. 1, drawn to a larger scale, and showing a boring tool therein.

Fig. 3 is a section similar to Fig. 2 and shows a boring tool in one side thereof and a burnishing tool in the opposite side thereof; the axis of the boring tool holder here being below and parallel with the axis of the burnishing tool and the axis of the burnishing tool being above and parallel with the axis of the burnishing tool holder; a cleaning means is shown secured to the tool head.

Fig. 4 is a section similar to Fig. 2 and shows a burnishing tool in diametrically opposite sides of the tool head; both burnishing tools here being mounted in the same tool holder and the axis of the burnishing tools being in alignment and inclined with the axis of the slot in the tool head.

Fig. 5 is a vertical section of the tool head, the section being taken on line 5—5 of Fig. 3 and shows a boring tool in one side thereof and a burnishing tool in another side thereof; the axis of the burnishing tool here being inclined to the axis of the boring tool.

Fig. 6 is an enlarged view illustrating the contact relation between the burnishing tool and the surface to be burnished.

Fig. 7 is an enlarged end view of the burnishing tool showing the eccentricity of the contact point with the axis of the burnishing tool holder to attain rotation of the burnishing tool.

Similar reference characters refer to similar parts throughout the views.

The boring device shown in Fig. 1 is similar to the boring device embodied in our previous application Serial No. 687,784, and is used herein to illustrate the use of the present surface finishing means. The present invention can, obviously, be used in and with other boring or similar devices, as well as with various devices adapted for finishing surfaces.

The boring device A shown in Fig. 1 has the boring head 10 at an end of the rotatable spindle 11 thereof. The device locating means 12 is also on the spindle 11 upwardly of the boring head. The tool head and the final locating means are disposed in the cylinder B of the four cylinder block shown.

The primary device locating element 13 extends into the cylinder C of the block and the clamping means 14 extends through the cylinder C.

The motor D is mounted on the outside of the device A and the driving shaft thereof extends into the device to drive the spindle feeding and the spindle rotating mechanism thereon to provide rotation for the spindle as well as feeding therefor. The handwheel E is for quickly moving the spindle axially or longitudinally when such movement is desired.

The boring tool means (Fig. 2) includes the tool head 15 having the slot 16 extending thereinto; the longitudinal axis of the slot being shown at right angles to the axis of the spindle 11. The wall 17 closes one end of the slot and the plate 18 closes the side of the slot. The plug 19 is driven into the wall 17 and the head thereof extends into the slot 16. The stub 20 is longitudinally slidably mounted in the inner end of the tool holder 21 which is longitudinally slidably mounted in the slot 16 and held therein by the plate 18. The spring 22 normally holds the stub 20 against the plug 19. The set screw 23 is threaded into the tool holder 21 to abut the stub 20. This screw may be tightened against the stub when the latter is to be held in a definite relation to the tool holder but can be released from the stub when the latter is to have longitudinal movement in the tool holder. The set screw 24 is threaded into the head 15 to abut the tool holder 21 to hold the same in a definite axial relation to the head 21 when tightened thereagainst and to allow the tool holder to move axially in the head when the set screw is released. The tool 25 is intended for boring and may be made, and preferably is made, of sintered carbide and is inserted into the tool holder 21 and is releasably held therein against endwise and rotative movement by the set screw 26.

This tool means is intended to bore the cylinder and is removable from the boring head 15 to be replaced by other tool means, if desired, in the present instance by the below described burnishing means.

In Figs. 3 and 5, the slots 16 are shown to extend into the head from opposite sides thereof to leave the partition 27 substantially in the middle thereof to divide the slot 16 into the compartments 161 and 162. A boring tool holder similar to the one shown in Fig. 2 is mounted in the compartment 161 and the burnishing tool holder is mounted in the compartment 162.

The boring tool shown in Figs. 3 and 5 is substantially of the same structure and operation as the one shown in Fig. 2.

The bushing 28 is mounted in the slot 162 and the tool holder 29 is rotatable and axially movable in the bushing 28. The burnishing tool 30 is made of an amalgam of different materials so that the same is very hard but not sufficiently brittle to chip. For want of a better term for this material we have adapted the term sintered material.

In this illustration, is shown that the axis of the bushing 28 is above the axis of the boring tool and the axis of the burnishing tool is above the axis of the bushing. All axes are parallel in this instance.

The spring 31 is here shown as being countersunk into the inner end of the bushing and as one end thereof abutting the bottom of the counterbore and the other end thereof abutting the partition 27. The strength of this spring should be sufficient to keep the burnishing tool against the wall 32 with sufficient pressure to attain burnishing by the tool 30 according to the material of the wall. Soft wall material will need less pressure behind the tool than harder material.

Two different types of cleaning means are here shown both in the form of wipers. The upper one has the resilient strip 33 attached to head 15 by means of the screws 34 as shown. The pad 35, of felt, bristles, or any other material suitable for wiping or cleaning is attached onto the strip 33. The lower wiper has the resilient strip 36 held onto the head 15 by means of the screws 37 as shown. The two pads 38 and 39 are attached to the respective ends of the strip 36.

Fig. 4 shows the block 40 mounted in the slot of the head 15 and the bushing 41 in the block 40. The axes of the block and of the bushing being the same. The bushings 42 and 43 are rotatable in the respective ends of the bushing 41 and the axes thereof are inclined from the axis of the bushing 41 as shown. The bushings 42 and 43 each projects a little distance outside thereof the respective side.

The burnishing tool 44 is mounted in the outer end of the bushing 42. The burnishing tool 45 is mounted in the outer end of the bushing 43. The blocks 46 may be pressed into the bushings as shown or may be made integral therewith. The ends of the one part spring 47 extend into counterbores in the bushings 42 and 43, respectively, and the ends of the spring abut the respective bottoms of the counterbores so that the spring normally tends to retain the burnishing tools against the wall 32. The screws 48 and 49 are tapped into the bushing 40 and enter the respective circumferential grooves 50 and 51. The set screws do not prevent rotation of the bushings unless they are tightened up for that purpose. Due to the width of these grooves and the screws 48 and 49 not being tightened against the bottom thereof, the bushings 42 and 43 can move axially as occasion may demand.

Fig. 5 shows the boring tool 52 mounted in the compartment 161 and the burnishing tool mounted in the compartment 162. The boring tool is of a structure similar to the one shown in Fig. 2.

The burnishing tool 53 is here shown as being mounted in the holder 54, which is rotatable in the bushing 55. The inner end of the bushing 55 abuts the bottom of the counterbore so that the burnishing tool can not recede from the wall 32. One end of the spring 56 abuts the partition and the other end telescopes into the bushing 54 and abuts the same endwise to normally move the burnishing tool outwardly the screw 57 and the circumferential groove 58 limit this outward movement.

In this instance, the axis of the burnishing tool holder 54 is inclined with the axis of the boring tool holder; the inclination being upwardly toward the outside of the head so that the burnishing tool is raised above the boring tool to locate the burnishing tool behind the boring tool in the direction of the feed of the tool head so that the burnishing tool will operate on surface after it has been machined by the boring tool.

Either the boring tools, or the burnishing tools, or both may be made of sintered material. It is preferred, however, that at least the burnishing tool is made of such material.

A principle of the present invention is to make the burnishing tool self dressing and to wear evenly and for that purpose rotate a burnishing tool about an axis thereof while the same is burnishing surface. This rotation is brought about by having an arcuate outer or end surface on the burnishing tool and arranging the tool so that the contact point of the arcuate surface on a wall to be burnished is eccentric with the axis of the burnishing tool so that rotation of the tool head in a finishing direction rotates the burnishing tool on its own axis in the head.

Figs. 6 and 7 show, on a larger scale, a part of the circular bore 32 and the arcuate surface 59 on the end of the burnishing tool in contact therewith at 60. This point 60 is eccentric with the axis 61 so that movement of this axis, due to rotative movement of the head, in the direction of the arrow shown in Fig. 7, will cause the contact point 60 to travel in the heavy dotted line circle 62 shown around the axis 61 in Fig. 7. The rotation of the burnishing bead squeezes the material of the higher parts of the surface 32 into the lower parts thereof to burnish the wall 32.

The rotation of the burnishing tool itself, on an axis of its own, rotates the tool individually and thereby continually brings new parts of the surface 59 into contact on the wall of the bore and thereby causes the surface 59 to be self dressing.

It is to be noted that the burnishing tool is not rotated by a separate mechanism and that it is not rotated continually or at even or constant rotative speed.

This rotation is effected by the contacting point 60 being worn down to slightly below the rest of the surface 59 whereupon the higher part of the surface 59, adjacent to the now worn down part thereof, is engaged by the wall being burnished and the burnishing tool is thereby rotated on an axis of its own and thereby continually presents a different part of the surface 59 to the wall being bored.

This rotation of the burnishing tool on an axis of its own usually is intermittent or spasmodic although it may be continuous or substantially continuous. In any event, this rotation of the burnishing tool brings the higher parts of the surface 59 into contact on the wall being burnished to be worn down thereby and tending to keep the surface 59 rotatively even and self dressing.

The rotative movement of the tool head and the feeding movement thereof assists in the rotation of the burnishing tool by continually moving the burnishing tool into contact on new surface to be burnished.

When the burnishing tool is so rotating, it bears only on one side of the outer edge of its hole and the inner end of the tool bears on one side of the bottom of the hole since the tool is held that way during its burnishing operation. The friction caused by this contact or bearing is insufficient to prevent rotative movement of the burnishing tool.

Fig. 6 is typical of the burnishing tool shown in the other views of the drawing.

The burnishing tip 63 is inserted into the sleeve 64 or is formed directly thereinto as shown in Fig. 6. The sleeve 64 rotates in the part 65 which may be a bushing inserted into a tool head or the sleeve 64 may rotate in the tool head itself. The pilot 66 extends into the annular groove 67. The spring 68 is here countersunk into the sleeve 64 to normally press the burnishing tool against the wall 32. Axial movement of the burnishing tool is limited by the walls 69 and 70 of the annular groove.

The drawing shows different typical arrangements of mounting the burnishing tool. Other types of mountings may be used. The object to be attained by this mounting is to attain eccentricity of the contact point of the burnishing tool on the surface to be burnished and the axis of the tool head to effect rotation of the burnishing tool for self dressing and even wear thereof around the axis thereof.

The boring tool shown in Fig. 2 is illustrative of boring tool structure and arrangement. A burnishing tool can be exchanged for the boring tool. In Fig. 3 is shown a boring tool and a burnishing tool in one head, one exchangeable with the other.

A feature of the present invention is to be able to set the burnishing tool to burnish a hole to a predetermined diameter even before the tool is attached to the tool head. The different set screws shown can be used for that purpose by tightening the same against the burnishing tool after the same is set for burnishing a hole to a predetermined size. In the tool arrangement shown in Fig. 4, for instance, a measuring instrument can be applied over the outsides of the burnishing tools to measure the diameter thereof. The bushing 41 can move exially in the block 40 so that the burnishing tools can adjust themselves according to the hole to be burnished. The set screws 48 and 49, when tightened will hold the respective bushings 42 and 43 in adjusted position in the bushing 41. Furthermore, the burnishing tool on one side can be set out a little further than the one on the opposite side when it is desired to do so.

The set screws 48 and 49 will hold the burnishing tools in whatever position the same may be set to.

With respect to adjusting the burnishing tool of Fig. 5 a suitable gage may be used for that purpose, or a measuring instrument may be applied over the outside of the burnishing tool and the outside of the tool head or over the opposite end of the tool holder. Also, a flat spot can be provided (not shown in the drawing) on the opposite side of the burnishing tool to function as a measuring base for that side. This spot can be made a definite distance from the axis of the head to facilitate calculations of the measurement made or to be made.

*Operation*

Upon rotation of the tool head 15 by the device A, the boring tool performs its usual function. The contact point of the burnishing tool on the surface to be burnished is eccentric with the axis thereof or of the boring tool so that this eccentric contact of the burnishing tool on the surface causes rotation thereof.

This rotation of the burnishing tool individually, coupled with the rotation of the tool head causes the arcuate surface on the end of the burnishing tip to frictionally engage the high spots or parts of the surface being burnished and thereby rotates the burnishing tool and at the same time press these high points into deeper parts adjacent thereto or compress the material to lower the high points to a level with the lower or deeper points and thereby produces a smooth surface and the material is made more dense by this burnishing.

The axial feeding of the tool head also assists in rotating the burnishing tool and materially aids to prevent the burnishing tool from finding a dead center line and pushes the burnishing tool off of any dead center if none is formed.

It is obvious that changes can be made in the structure and in the arrangement of the tools and that the tools can be used on or with other boring devices than the one shown and described herein. The manner of making changes is indicated herein by the different structures shown and described. Therefore, this application is not limited to the precise boring device as shown nor to the precise structure and arrangements of the boring and burnishing tools as shown.

Therefore, without limiting ourselves to the precise application of our invention as shown and described nor to the precise structure and arrangements of parts as shown and described, within the spirit and intent and scope of the appended claims,

We claim:

1. In a burnishing device for walls of bores, a rotatable tool head having a socket therein disposed at a small angle to a plane vertical to the axis of rotation of said head, a cylindrical burnishing tool fitting said socket and being rotatable therein and an end thereof being exposed, the exposed end of said burnishing tool being spherical to engage the wall of the bore eccentrically of the the axis of said socket, and a spring in said socket whereby said burnishing tool is permitted to rotate and is resiliently pressed against the wall of the bore and is rotated by frictional engagement on the wall of the bore.

2. In a burnishing device for walls of bores, a rotatable tool head having a socket therein disposed at a small angle to the plane of rotation of said head, a bushing in said socket, a tool holder rotatable in said bushing, a burnishing bit fixed in said bushing and having the outer end thereof exposed and spherical in form and the axis thereof being eccentric with the axis of said bushing to engage the wall of the bore eccentrically of the axis of the socket to rotate said tool holder upon friction contact of said bit on the wall of the bore, and a spring in said bushing whereby said bushing is permitted to rotate and said burnishing bit is resiliently pressed against the wall of the bore.

3. In a bore finishing device, a rotatable head having a boring tool mounted therein and a socket extending thereinto in a plane at a small angle to the plane of rotation of said head, a bushing in said socket, a tool holder rotatable in said bushing, a burnishing bit fixed in said tool holder eccentric with the axis of said bushing, the outer end of said bit being exposed and being spherical and the axis thereof being eccentric with the axis of rotation of said bushing, and a spring in said bushing whereby said bushing is permitted to rotate and said burnishing bit is resiliently pressed against the wall of the bore to frictionally engage the same and thereby rotate said tool holder.

4. In a bore finishing device, a rotatable head, a boring tool therein and a socket extending thereinto at a small angle to the plane of rotation of said head, a bushing in said socket, a tool holder rotatable in said bushing, a burnishing bit fixed in said tool holder, the outer end of said bit being exposed and being spherical and the axis thereof being eccentric with the axis of said bushing and with the axis of rotation of said tool holder, a spring in said bushing whereby said bushing is permitted to rotate and said bit is resiliently pressed into frictional contact on the wall of the bore, a spring fixed to said head, and a wiper fixed to said spring and pressed against the surface being bored by the second mentioned spring.

JOHN Y. BLAZEK.
RUSSELL G. ANDERSON.